United States Patent [19]

Sarayeddine

[11] Patent Number: 6,072,628
[45] Date of Patent: Jun. 6, 2000

[54] OPTICAL POLARISATION DEVICE

[75] Inventor: Khaled Sarayeddine, Nouvoitou, France

[73] Assignee: Thomson multimedia S.A., Boulogne, France

[21] Appl. No.: 09/015,141

[22] Filed: Jan. 29, 1998

[30] Foreign Application Priority Data

Jan. 29, 1997 [FR] France ................................. 97 00919

[51] Int. Cl.⁷ ............................... G02B 5/30; G02B 5/04
[52] U.S. Cl. ......................... 359/487; 359/483; 359/485; 359/833; 359/834
[58] Field of Search .............................. 359/15, 487, 488, 359/494, 495, 496, 742, 833, 834

[56] References Cited

U.S. PATENT DOCUMENTS

| | | | |
|---|---|---|---|
| 5,124,841 | 6/1992 | Oishi | 359/487 |
| 5,410,421 | 4/1995 | Huignard et al. | 359/15 |
| 5,828,471 | 10/1998 | Davis et al. | 359/15 |
| 5,900,973 | 5/1999 | Marcellin-Dibon | 359/487 |

FOREIGN PATENT DOCUMENTS

| | | |
|---|---|---|
| 0573905 | 12/1993 | European Pat. Off. . |
| 0606939 | 7/1994 | European Pat. Off. . |
| 2735875 | 12/1996 | France . |

OTHER PUBLICATIONS

Patent Abstracts of Japan, vol. 011, No. 216, (P–595) 14 Juillet 1987 & JP 62034104A (Mitsubishi Electric Corp.), 14 Fevrier 1987.

Search Report for French Appln. No. 9700919.

*Primary Examiner*—Cassandra Spyrou
*Assistant Examiner*—Audrey Chang
*Attorney, Agent, or Firm*—Joseph S. Tripoli; Frederick A. Wein; Daniel E. Sragow

[57] ABSTRACT

An optical polarization device includes a source of light emitting a non-polarised light beam. A polarization separator reflects one polarization component of the light beam and transmits the other polarization component. A reflection means receives the component reflected by the polarization separator, rotates its polarization plane through 90°, and returns it to the polarization separator. The polarization separator is a plane element. The reflection means is positioned on the source side of the separator and consists of a regular network of prisms, each partially covered with a reflective layer associated with a λ/4 plate.

8 Claims, 2 Drawing Sheets

OPTICAL POLARISATION DEVICE

FIELD OF THE INVENTION

The present invention concerns an optical polarisation device, particularly a device for transforming a randomly polarised light coming from a light source into a linearly polarised light.

BACKGROUND OF THE INVENTION

The use of a linearly polarised light is necessary notably for illuminating the liquid crystal valves used in projection or back-projection.

Because of this, there exist on the market numerous types of optical polarisation devices for obtaining a linearly polarised light.

Thus, in the French patent application No. 95 07396 filed in the name of THOMSON Multimedia, corresponding to U.S. Pat. No. 5,900,973, issued May 4, 1999 an optical polarisation device was proposed, affording good recombination of the beams on each other and exhibiting low dispersion.

This optical polarisation device, described in more detail with reference to FIG. 1, is associated with a lamp 1, which can be an arc lamp of the metallic halide type, with a filament or similar. This lamp 1 is positioned at the focus of a reflector 2, of parabolic or elliptical shape, provided in a known fashion with a condenser. The light emitted by the lamp 1 is a white light with random polarisation. It is reflected by the reflector 2 and transmitted onto a polarisation converter assembly. This assembly includes a polarisation separator 3 which consists, in this embodiment, of a stack of glass sheets so as to form an air/glass stack. The polarisation converter also has a mirror 4, whose role is to reflect, towards the polarisation separator 3, the components s of the light beam. This mirror 4 is associated with a $\lambda/4$ plate 5, which rotates the plane of polarisation of the reflected beam through 90°. At the exit from the polarisation separator 3, there is found a polarisation recombination means 6. In the embodiment in FIG. 1, the means 6 of recombining the polarisation components is a means functioning in total reflection and consists of a transparent sheet produced from a material such as methacrylate, carbonate or other similar materials, glass also being able to be used. This means has, on its face receiving the beam coming from the polarisation separator 3, a set of microprisms 6' placed in a parallel row. The other face is composed of a plane face 6".

In the device described above, the light beam coming from the lamp 1 arrives at the polarisation separator 3. In a known fashion, the polarisation components p of the beam pass directly through the polarisation separator, they arrive on the faces 6' of the recombination means 6 and are then transmitted inside the means 6 so as to leave perpendicularly to the face 6". Moreover, the polarisation components s of the light beam are reflected and sent towards the mirror 4, where they undergo total reflection and pass once again through the $\lambda/4$ plate 5 so that their polarisation plane is rotated through 90°. The new component referenced p' is then sent onto the polarisation separator 3. At the exit from the separator 3, the component p' is sent onto the recombination means 6, the beam p' strikes the inclined external surface of the microprism at an angle which is almost perpendicular. Next, it is transmitted to the inside of the microprism and strikes the internal face of the adjacent surface on which it is reflected so as to emerge perpendicularly to the face 6".

With this system, a good superimposition of the components p and p', is therefore obtained at the exit. However, the bulk of this optical polarisation device is far from negligible. Moreover, in the plane of the liquid crystal screen which will receive the beams p and p', the two polarised beams have not followed the same optical path. This entails a distribution of illumination which is different for the two beams.

SUMMARY OF THE INVENTION

The aim of the present invention is to propose a novel optical polarisation device which makes it possible to reduce the bulk of the system and to equalise as far as possible the optical paths of the two polarised beams.

Consequently, the object of the present invention is an optical polarisation device including:

- a light source emitting an unpolarised light beam;
- a polarisation separator reflecting one polarisation component of the light beam and transmitting the other polarisation component, and
- a reflection means receiving the component reflected by the polarisation separator, rotating its polarisation plane through 90° and returning it to the polarisation separator, characterised in that the polarisation separator is a plane element and in that the reflection means is positioned in front of the polarisation separator and is formed by a regular network of prisms covered with a reflective layer associated with a means for rotating the polarisation, the reflection means being such that the light beam coming from the source is transmitted directly whilst the beam reflected by the polarisation separator passes through the means for rotating the polarisation, is reflected onto the regular network of prisms and passes again through the means for rotating the polarisation.

According to a first embodiment, the polarisation separator consists of a stack of at least two glass sheets separated by a layer of air, and the means for rotating the polarisation is a $\lambda/4$ plate.

According to a second embodiment, the polarisation separator consists of a birefringent element which reflects one polarisation and transmits the other, such as a cholesteric filter. In this case, the means for rotating the polarisation is unnecessary.

With the above embodiments, the regular network of prisms is composed of first and second sheets each having complementary prismatic surfaces fixed to each other, the prismatic surface of the first sheet being covered with a reflective surface.

According to a third embodiment, the polarisation separator consists of a holographic separator positioned between a first regular network of prisms forming the said reflection means and a second regular network of prisms which is symmetrical with respect to the separator, the angle at the apex of the two regular networks of prisms being identical and chosen as a function of the angle of incidence on the holographic separator.

BRIEF DESCRIPTION OF THE DRAWINGS

Other characteristics and advantages of the present invention will emerge from a reading of the description given below of different embodiments, this description being given with reference to the accompanying drawings in which.

DETAILED DESCRIPTION OF PREFERRED EMBODIMENTS

In order to simplify the description, in the figures, the identical components have the same references.

Figure 1:
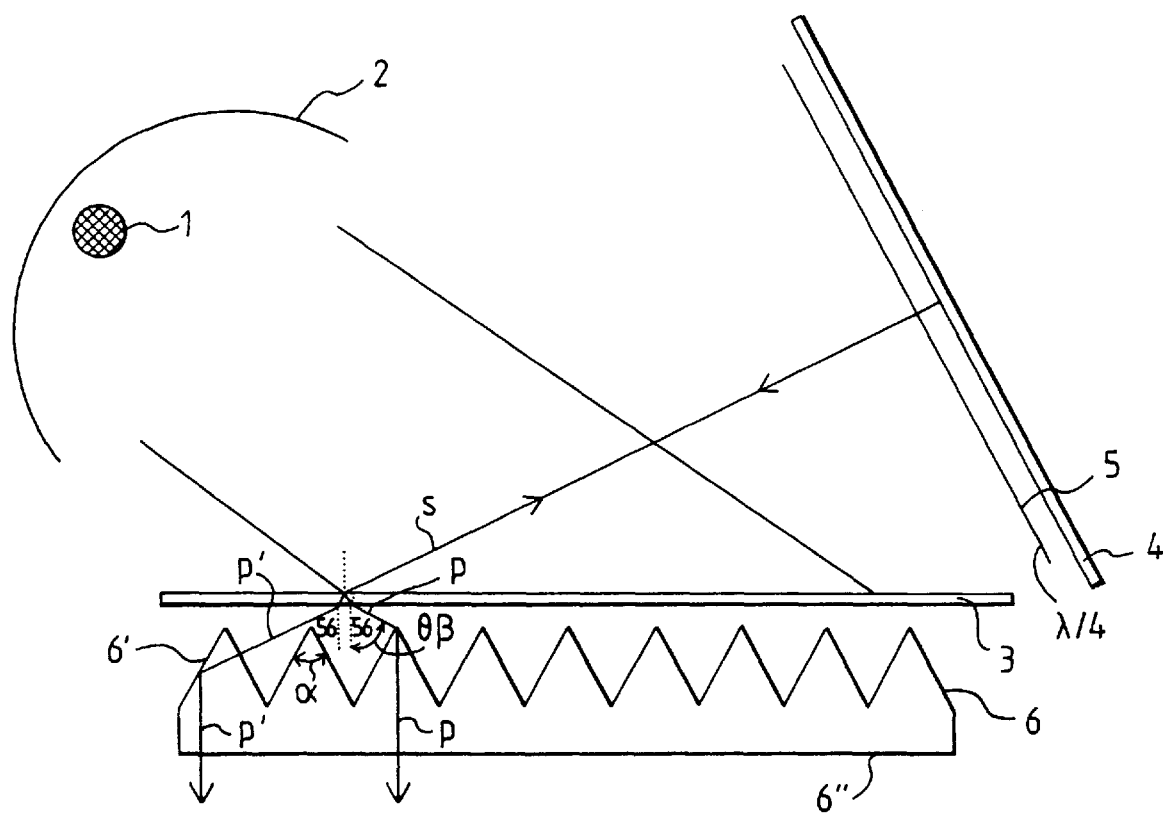
FIG. 1 already described depicts diagrammatically an optical polarisation device according to the prior art.
Figure 2:
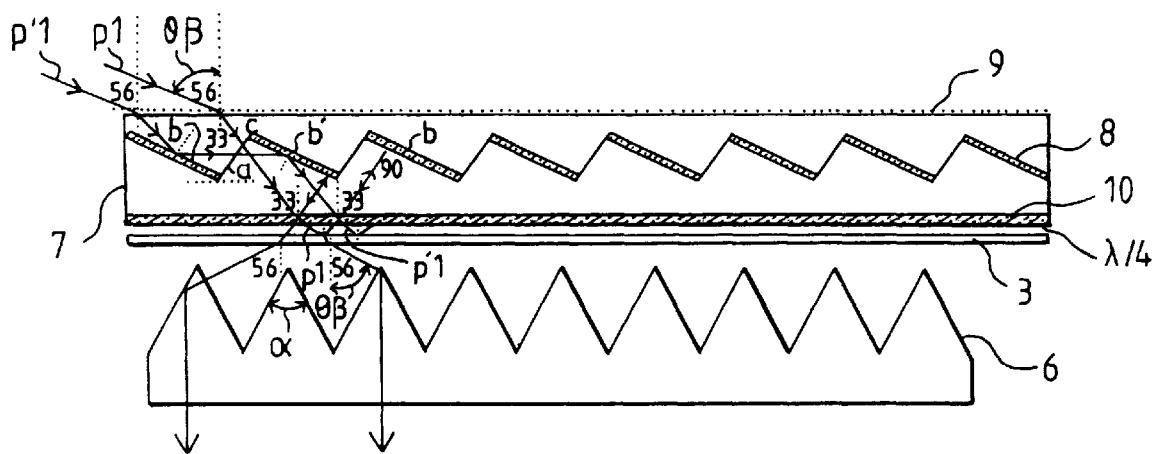
FIG. 2 depicts diagrammatically a first embodiment of an optical device according to the present invention.

FIG. 2 depicts a first embodiment of an optical polarisation device according to the present invention which is smaller in size. In this optical polarisation device, the polarisation separator 3 consists of a stack of at least two glass sheets separated by a layer of air of the same type as the one used in the polarisation device in FIG. 1. Likewise, the beams coming from the separator 3 are sent to a recombination means 6 identical to the one described with reference to FIG. 1. In this embodiment, in order to reduce the total size of the device, the reflection means no longer consists of a mirror and $\lambda/4$ plate, as in the embodiment of FIG. 1, but of the device marked 7 in FIG. 2. Two embodiments of the reflection means 7 are depicted in more detail in FIGS. 3a and 3b.

Figure 3A:
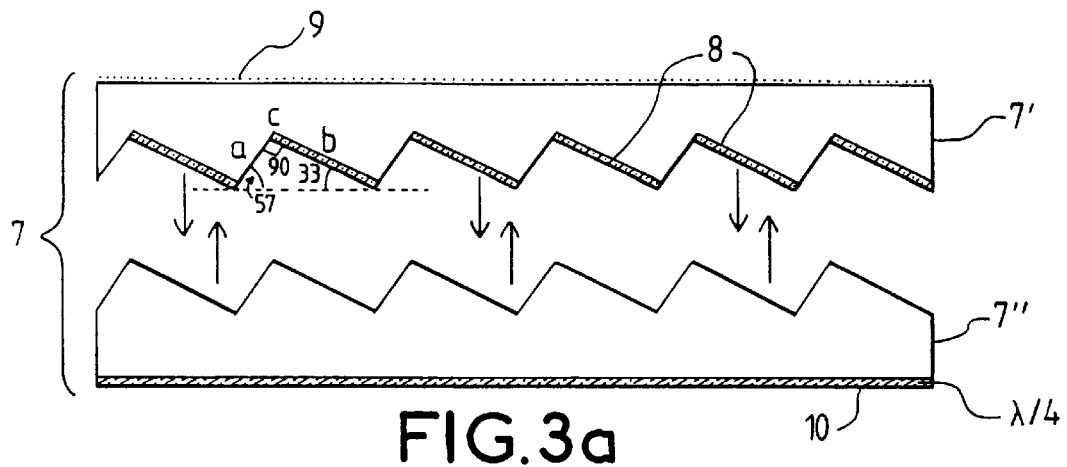
FIGS. 3a and 3b are two embodiments of the reflection means used in the optical device of FIG. 2.

In FIG. 3a, the means 7 is a regular network of prisms composed of two sheets 7', 7". The sheet 7' has a plane entry surface covered, in the embodiment depicted, with a non-reflecting layer 9. It has, on its exit side, a regular network formed by microprisms. The shape of the microprisms in cross section corresponds to a right-angled triangle a,b,c where the angle at the apex c is equal to 90° and where the other two angles are chosen according to the Brewster angle, namely 57° and 33° in the present embodiment. The longest side cb of the triangle is covered with a reflective surface 8, which can consist either of a cold mirror or a metallic coating such as aluminium or the like. The small side ac is not covered so as to allow light beams arriving at this surface to pass, as will be explained below. The first sheet 7' is associated with a complementary sheet 7" having on its entry surface a microprismatic structure complementary to the microprismatic structure of the sheet 7'. The two sheets 7' and 7" are fixed together by an optical adhesive of a known type. In addition, as depicted in FIG. 3a, a $\lambda/4$ plate 10 is placed on the exit surface of the sheet 7". In the embodiment in FIG. 3b, the $\lambda/4$ plate is separated into small $\lambda/4$ plates 11 stuck onto the reflective surfaces 8. The other parts of the reflection means 7 are produced as in FIG. 3a.

Figure 3B:
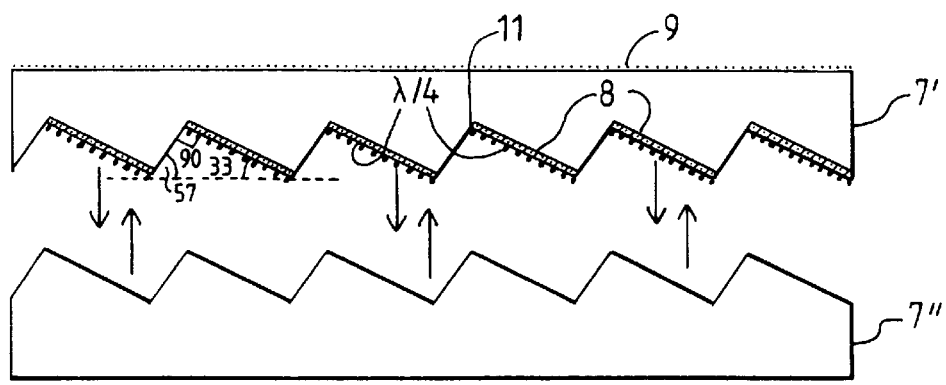

The reflection means 7 formed by a regular network of microprisms, as depicted in FIGS. 3a and 3b, is used with a light source consisting of a lamp 1 and a reflector 2 which are not shown, both of which are positioned so that the entry light beams arrive at the entry surface of the means 7 at an angle $\theta\beta$ representing the Brewster angle. In fact, the reflection means 7 is associated with a polarisation separator consisting of sheets situated by means of an air/glass stack. In this case, the angle $\theta\beta$ which is found at the exit from the said separator is equal to the Brewster angle, namely an angle of 56.6° for the glass. Because of this, the rays leaving the means 7 must arrive at the separator in order to obtain the desired angle $\theta\beta$ at the exit from the separator 3. It is understood by persons skilled in the art that the above values are valid to within +10° and are a function of the materials used.

An explanation will now be given, in more detail, of the functioning of the device of FIG. 2.

In this case, the light beam coming from the lamp 1 is sent onto the entry surface of the reflection means 7 so that the beams p1, p'1 arrive substantially at the angle $\theta\beta$ with respect to a perpendicular to the entry surface of the means 7. This means 7 is produced from a transparent material such as methacrylate or glass. The rays p1, p'1 propagate inside the structure 7. For example the ray p1 passes through the surface a whilst the reflected ray p' strikes the face b of a microprism of the network of microprisms which is coated with a reflective material. This ray is reflected onto the surface b' of the adjacent microprisms, this surface p' also being covered with a reflective material so that the beam p'1 arrives passing through the $\lambda/4$ plate 10 onto the polarisation separator 3. With this structure, the two rays p1 and p'1 arrive in parallel on the polarisation separator 3, as depicted in FIG. 2.

The functioning of the polarisation separator will now be explained with reference to the beam p1. The polarisation component p of the beam p1 passes directly through the polarisation separator 3 in a known fashion whilst the component s of the polarisation beam p1 is reflected and sent back through the $\lambda/4$ plate towards a surface b coated with a reflective material of the Fresnel structure 8. The component then undergoes a total reflection, as indicated by the double arrow, and passes once again through the $\lambda/4$ plate 10 so that its polarisation plane is rotated through 90°. The new component is then sent onto the polarisation separator, which it passes through, making on exit an angle substantially equal to the Brewster angle with respect to a perpendicular to the plane of the separator. The beams coming from the separator are then sent in a known fashion towards a means of recombining the polarisation components which is identical to that described with reference to FIG. 1.

A description will now be given, with reference to FIG. 4, of another embodiment of an optical polarisation device in accordance with the present invention. In this case, the polarisation separator consists of a holographic separator 20. This holographic separator can consist of a single hologram or a multitude of holograms corresponding to the conventional colours R, G, B sealed in them. With a holographic separator, the polarisation separation function is obtained by recording the interference patterns of two coherent plane waves in a thin-film photosensitive material. The variation in the index induced within the material is high. The variations in recording index make it possible to produce a mirror function for one polarisation component (Brewster conditions at 45°), the second polarisation component being transmitted in totality.

Figure 4:
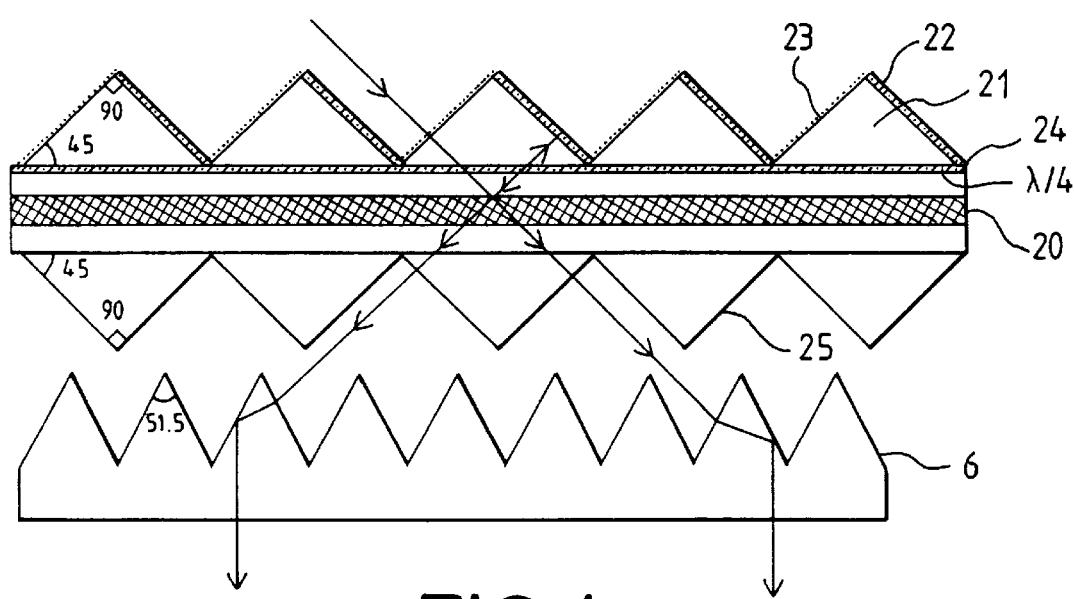
FIG. 4 is a diagrammatic view of another embodiment of an optical polarisation device according to the present invention.

In the case of FIG. 4, the holographic separator is sealed between a first structure producing the reflection means and a symmetrical second structure. The first structure is a linear network 21 formed by microprisms having in cross section the shape of a right-angled isosceles triangle, one of whose faces 22 is covered with a reflective material for reflecting the component of the polarisation s, whilst the other face is covered with a non-reflecting layer 23. As depicted in FIG. 4, a $\lambda/4$ plate 24 is provided parallel to the holographic separator 20. In addition, a second linear network of microprisms 25 symmetrical with the network 21 with respect to the holographic separator is produced so that the components of the light beams leave the separator 20 directly. A recombination means 6, identical to that described with reference to FIGS. 1 and 2, is associated with this device. It is clear to persons skilled in the art that the position of the $\lambda/4$ plates can be achieved as with the embodiment in FIGS. 2 and 3, namely either a single $\lambda/4$ plate parallel to the separator, or elements of $\lambda/4$ plates stuck to the reflective surfaces 22.

Likewise, the angle at the apex of the prismatic structures is chosen as a function of the angle of incidence on the holographic separator. The angle at the apex is an angle of 90° if the angle of incidence of the hologram is 45°.

It is also possible, according to another embodiment, to use as the separator an element produced from a birefringent substance which reflects one polarisation and transmits another. This substance can be based on liquid crystal, for example, of the cholesteric filter type or another material. In this case, it is necessary to adapt the angle at the apex of the prism to the angle of incidence used for the birefringent material. With a cholesteric filter, the $\lambda/4$ plate is no longer necessary.

Other modifications can be made to the present application, relating notably to the prismatic structures, the materials used and other things, without departing from the scope of the following claims.

What is claimed is:

1. Optical polarisation device for transforming an unpolarised incident beam of light into a linearly polarised beam of light, said optical polarisation device comprising:

a polarisation separator reflecting one polarisation component of the light beam and transmitting the other polarisation component, said polarisation separator being constituted by a plane element, a reflection means receiving the component reflected by said polarisation separator, including means for rotating its polarisation plane through 90° and returning it to the polarisation separator toward the beam of unpolarized light, said reflection means being positioned on the side of the polarization separator toward the beam of unpolarized light and being formed by a regular network of prisms composed of first and second sheets having complementary prismatic surfaces facing each other, the shape of each prism in cross-section corresponding to a right-angle triangle where the angle at the apex is equal to 90°, and one of the two other is approximately equal to the Brewster angle of the prisms, the longest side of each triangle opposite the hypotenuse being covered with a reflective layer, said means for rotating polarisation positioned between said reflective layers and said polarization separator.

2. Optical polarisation device according to claim 1, wherein the means for rotating polarization is constituted by a $\lambda/4$ plate attached to a surface of said reflection means facing said polarisation separator.

3. Optical polarisation device according to claim 1, wherein the means for rotating polarization is constituted by $\lambda/4$ plates attached to each reflective surface.

4. Optical polarisation device according to claim 1, wherein the polarization separator comprises a stack of at least two glass sheets separated by a layer of air.

5. Optical polarisation device according to claim 1, wherein the reflective layer comprises one of a cold mirror and a metallic coating.

6. Optical polarisation device, according to claim 1, wherein the reflection means has a plane entry surface covered with a non-reflecting layer.

7. Optical polarisation device according to claim 1, wherein the sheets are made of a transparent material.

8. Optical polarisation device according to claim 1, further comprising a recombination means positioned on the side of the polarisation separator remote from the beam of unpolarized light.

* * * * *